US006920212B2

United States Patent
Stern et al.

(10) Patent No.: US 6,920,212 B2
(45) Date of Patent: Jul. 19, 2005

(54) METHOD AND APPARATUS FOR TELECONFERENCING

(75) Inventors: Andrew L. Stern, Cotuit, MA (US); Christopher Young, Mashpee, MA (US)

(73) Assignee: Intelligent Meetings Corp., Mashpee, MA (US)

( * ) Notice: Subject to any disclaimer, the term of this patent is extended or adjusted under 35 U.S.C. 154(b) by 314 days.

(21) Appl. No.: 09/971,833

(22) Filed: Oct. 5, 2001

(65) Prior Publication Data

US 2003/0072428 A1 Apr. 17, 2003

(51) Int. Cl.[7] ............................................... H04M 3/54
(52) U.S. Cl. ................. 379/202; 10/207.13; 10/207.14; 10/210.01
(58) Field of Search ................... 379/201.01, 207.14, 379/207.13, 202.01, 210.01; 370/260

(56) References Cited

U.S. PATENT DOCUMENTS

| 5,233,642 A | * | 8/1993 | Renton ........................ 455/405 |
| 5,381,467 A | | 1/1995 | Rosinski et al. |
| 5,495,284 A | | 2/1996 | Katz |
| 5,495,522 A | | 2/1996 | Allen et al. |
| 6,005,870 A | | 12/1999 | Leung et al. |
| 6,330,320 B1 | * | 12/2001 | Cornell et al. ......... 379/202.01 |
| 6,438,111 B1 | * | 8/2002 | Catanzaro et al. .......... 370/260 |

* cited by examiner

Primary Examiner—Ahmad F. Matar
Assistant Examiner—Marie C. Ubiles
(74) Attorney, Agent, or Firm—Lowrie, Lando & Anastasi, LLP

(57) ABSTRACT

A method for assigning access information for a teleconference to a group of conferees comprises assigning a conference I.D. number to the group of conferees, and dividing the conference I.D. number into a first portion and a second portion. An input sequence is derived from the first portion of the conference I.D. number and assigned to the group of conferees. A PIN is derived from the second portion of the conference I.D. number and assigned to each conferee of the group of conferees. In another embodiment, a teleconferencing bridge includes a programmable device effecting a sequence of instructions comprising receiving information derived from a first string of digits entered by a conferee, receiving a PIN entered by the conferee, deriving, from the PIN and a portion of the information derived from the first string of digits, a conference I.D. number, and validating the conference I.D. number.

32 Claims, 3 Drawing Sheets

METHOD AND APPARATUS FOR TELECONFERENCING

FIELD OF THE INVENTION

The present invention is directed toward a method and apparatus for teleconferencing.

BACKGROUND

Video and audio teleconferencing technology is moving toward automated services that do not require an operator to manually connect parties to the conferences. Typically, the teleconferencing service provider allocates one or more personal identification numbers (PINs) to subscribers and connects each subscriber to their intended conference based on the PIN entered by the subscriber, through equipment known as a teleconferencing bridge. A conference usually includes a host who organizes or leads the conference, and a number of guests. The host may often have additional privileges beyond those of the guests, such as, for example, being able to add or remove guests from the conference, and may be distinguished from the guests by having a PIN that is different from the PIN or PINs assigned to the guests.

As the number of subscribers to teleconferencing services increase, most service providers are responding by providing subscribers with PINs ranging from four to twelve digits in length. The shorter the PIN, the fewer variations, and thus the fewer unique available PINs. While in theory, a four digit PIN would allow 10,000 subscribers to each have a unique PIN, in fact the number of subscribers must be considerably lower to maintain an acceptable level of security. For example, if all 10,000 possible PINs were assigned to subscribers, an "eavesdropper" (unauthorized user) would have a 100% probability of being connected to a conference simply by guessing any one of the possible variations. Similarly, if a very large percentage of the possible variations are used as PINs, an unauthorized user would have a fairly substantial chance of guessing one of the variations correctly and being connected to a conference. Thus, in order to maintain security of the system, only a few of the possible PINs may be used as actual PINs.

Therefore, as the number of subscribers increases, one solution generally adopted in the industry is to provide each subscriber with a longer PIN, typically ranging between seven and 10 digits, and some systems may support PINs up to 16 digits in length. However, while most subscribers may be satisfied with the ease of use of a four or five digit PIN, they may begin to struggle as the PIN increases towards 10 digits or even longer. Furthermore, as the length of the numeric string that the subscriber must enter increases, the probability of mis-keying increases geometrically.

Another option used by some teleconferencing bridges is to require two levels of security, and two PINs per subscriber. For example, one PIN may be used to identify the individual subscriber and the other to identify the particular conference that the subscriber wishes to join. However, this solution is not ideal as the subscriber must still remember and enter two PINs. Even if each of these PINs is only, for example, four digits in length, there is still more difficulty for the subscriber to remember two numbers rather than only one, and the chance of error, either in mis-keying or confusing the two PINs, is still substantial.

Another technology that is currently being developed is "voice-over-IP". Voice-over-IP refers to a communication methodology where voice is transferred over a data network, such as the Internet or a local area network (LAN), as opposed to a traditional voice telephone network. Traditional voice telephone networks are typically "circuit-switched", meaning that for every conversation a dedicated "circuit" is formed between parties, and voice is transmitted over a dedicated channel. By contrast, data networks are typically packet-switched, meaning that data transmitted between parties is broken up into packets, and transmitted across the network in an ad hoc fashion, using connections as bandwidth becomes available, with no dedicated connection formed between parties. In these systems a large piece of data, for example a sentence spoken by one party, may be broken up into a number of data packets. Each packet may include, in addition to the actual data bits, address bits that identify the sender and destination, and possibly the "session" (for example, conversation) to which the data belongs. Various protocols have been established that dictate what bits are required in each packet. The packets are transmitted over the network using any connection within the network that happens to have available bandwidth, and are ultimately directed to their identified destination. Network routers are typically provided with software algorithms that determine the most efficient path for each packet over the network. Thus different packets all containing data that belongs to a single session, for example conversation, arrive at the destination via different routes, and may not arrive in the order in which they were transmitted. Although network devices are typically provided with software to enable them to reassemble the received packets into the proper order, this may take time. While this is typically not a problem for most data transfers, it can create problems in voice communication where long delays (on the order of tenths of seconds) are not acceptable, and where it is critical that the listener receive the voice data in the proper order. Systems are being developed that address these issues to provide acceptable quality voice communication over data networks such as the Internet.

SUMMARY

According to one embodiment, a method of assigning access information for a teleconference to a group of conferees comprises assigning a conference I.D. number to the group of conferees, and dividing the conference I.D. number into a first portion and a second portion. The method includes assigning an input sequence to the group of conferees, the input sequence being derived from the first portion of the conference I.D. number, and assigning a PIN to each conferee of the group of conferees, the PIN being derived from the second portion of the conference I.D. number.

Another embodiment is directed toward a method of allocating available space on a teleconferencing bridge to a group of subscriber units, the method comprising receiving information derived from a telephone number upon which a call from a subscriber unit is received, and receiving a PIN from the subscriber unit. The method further includes deriving, from the PIN and the information derived from the telephone number, a conference I.D. number, validating the conference I.D. number, and allocating the space to the subscriber unit based on a result of validating the conference I.D. number.

Another embodiment is directed toward a computer readable medium encoded with a plurality of instructions for execution on at least one processor. The plurality of instructions performs a method for accessing a teleconference, the method comprising receiving information derived from an input sequence entered by a subscriber unit, and receiving a PIN from the subscriber unit. The method further comprises deriving, from the PIN and the information derived from the input sequence, a conference I.D. number, and validating the conference I.D. number.

According to another embodiment, a teleconferencing bridge includes at least one programmable device effecting a sequence of instructions comprising receiving information derived from a first string of digits entered by a conferee and receiving a PIN entered by the conferee. The sequence of instructions also includes deriving, from the PIN and a portion of the information derived from the first string of digits, a conference I.D. number, and validating the conference I.D. number.

Yet another embodiment is directed toward a teleconferencing bridge including at least one programmable device that effects a sequence of instructions comprising receiving information derived from an input sequence entered by a conferee, receiving a PIN from the conferee, and generating a conference I.D. number based on at least a portion of information received and the PIN.

BRIEF DESCRIPTION OF THE DRAWINGS

The foregoing and other objects and advantages will be more fully appreciated from the following detailed description when taken in connection with the following drawings. It is to be understood that the drawings are for the purpose of illustration only and are not intended as a definition of the limits of the invention. In the drawings, in which like elements are represented by like numerals.

DETAILED DESCRIPTION

In view of the problems discussed in reference to the prior art teleconferencing systems, it may be desirable to provide a method of teleconferencing which allows the use of a short personal identification number (PIN) over a large subscriber base, without sacrificing security or availability of PIN's.

Figure 1:
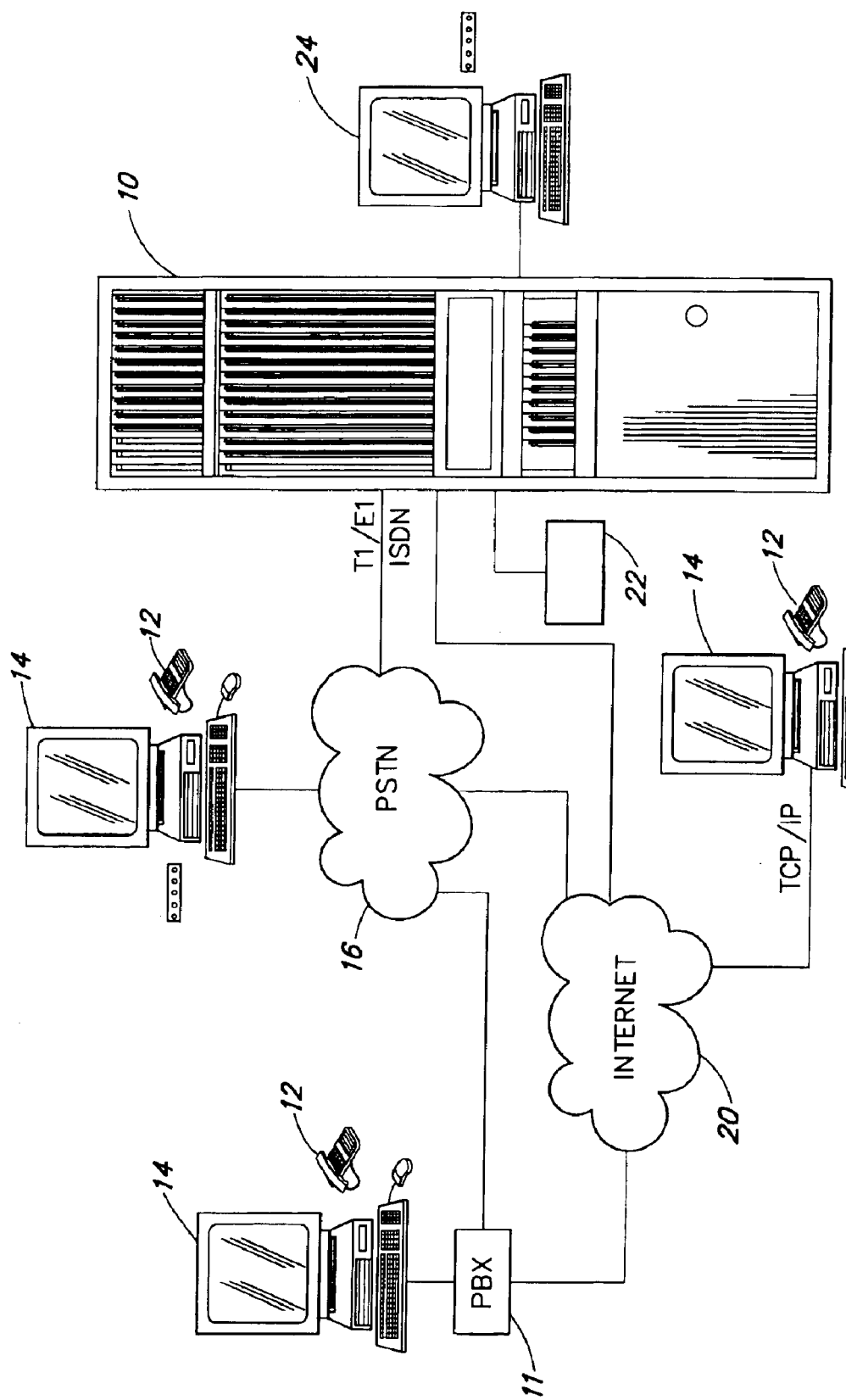
FIG. 1 is a block diagram illustrating one example of a teleconferencing system.

Referring to FIG. 1, a teleconferencing bridge 10 may be connected to a public switched telephone network (PSTN) 16 via, for example, a T1 or ISDN line 18. A plurality of subscriber units, which may be, for example, telephone handsets 12 or computer terminals 14, may be connected to the bridge 10 via the PSTN 16. A private branch exchange (PBX) 11 may be provided between a subscriber unit and the PSTN. Alternatively, the subscriber units may be connected to the teleconferencing bridge 10 via a local or wide area network (LAN/WAN) 20, for example, the Internet. Again, a PBX 11 may exist between the subscriber unit and the LAN/WAN. The teleconferencing bridge 10 may also include, or be connected to, an operator console 24, as will be discussed in more detail *infra*.

The teleconferencing bridge may identify individual conferences by means of a unique conference identification (I.D.) number. The teleconferencing bridge may include a storage element 22 where it may maintain a database of conference I.D. numbers and information regarding the associated conferences, and subscribers. The conference I.D. number may also be used by the bridge to distinguish between a host and guests of a particular conference, as will be discussed in more detail *infra*. The conference I.D. number may be used to derive an input sequence, such as a string of digits, for example, a telephone number, that may be assigned to a subscriber to allow the subscriber to access the teleconferencing bridge. Direct inward dial (DID) capability is a service provided by many telephone service companies that provides a block of pre-assigned numbers for calling into a private branch exchange. Using DID, a teleconferencing bridge may be accessible through many individual telephone numbers without requiring a physical line into the private branch exchange for each possible telephone number. The teleconferencing bridge may thus be accessible through many pre-assigned telephone numbers which have been allocated to the bridge by a telephone service provider and are available for use by subscribers to hold conferences.

Figure 2:
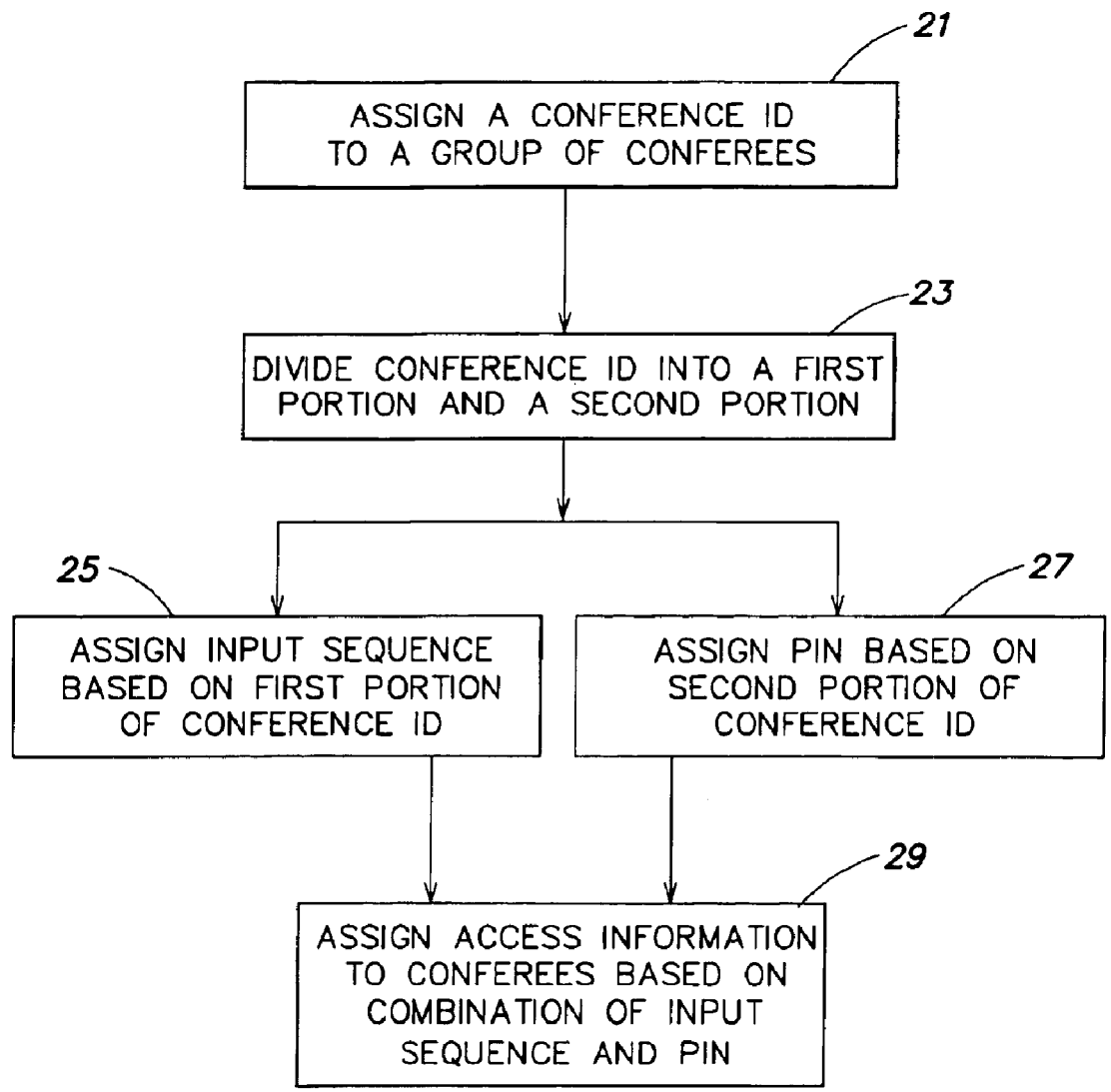
FIG. 2 is a flow diagram illustrating an exemplary method for assigning access information to a conference to a group of conferees.

Referring to FIG. 2, a particular conference I.D. number may be assigned to a group of conferees, step 21, to identify a predetermined conference to which the conferees may ultimately be connected. The conference I.D. number may be divided into a first portion, at least a part of which is used to derive an associated string of digits that may form part of a telephone number (one of the pre-assigned numbers) entered by a subscriber to join a conference, and a second portion, at least a part of which is used to derive a PIN to be entered by the subscriber, as illustrated in steps 23, 25 and 27. It is to be appreciated that while the following methods will be described in terms of the conference I.D. number consisting of two portions, this is by way of example only and not intended to be limiting. The conference I.D. number may be divided into any number of portions which may be used to generate various strings of digits, so as to allow the use of a short PIN over a large subscriber base. Access information to the predetermined conference may then be assigned to the conferees based on a combination of the input sequence and the PIN, step 29, as will be discussed in more detail *infra*.

Another service provided by many telephone service is a dialed number identification service (DNIS). DNIS is a service that identifies for a receiver of a call the number that the caller entered. In the United States, telephone numbers typically include seven digits that identify an exchange and individual line, and additional digits for an area, toll-free, or country code. DNIS may provide the receiver of the call, i.e., the teleconferencing bridge, with all or some of the digits making up the number entered by the caller.

Referring again to FIG. 1, the teleconferencing bridge 10 may include an operator console 24, which may have a graphical user interface, to allow an operator to control the conferences running through the teleconferencing bridge. The operator console may typically be a personal computer, although it is not limited to such and may be another type of computer or a custom piece of equipment. Through the operator console, an operator may create and update subscriber records, conference I.D. numbers, and billing information. The operator may also generate billing reports and usage reports. The operator may program the teleconferencing bridge to utilize a particular function or set of functions to generate conference I.D. numbers from pre-assigned DID numbers, and to generate PINs having a certain number of digits.

Figure 3:
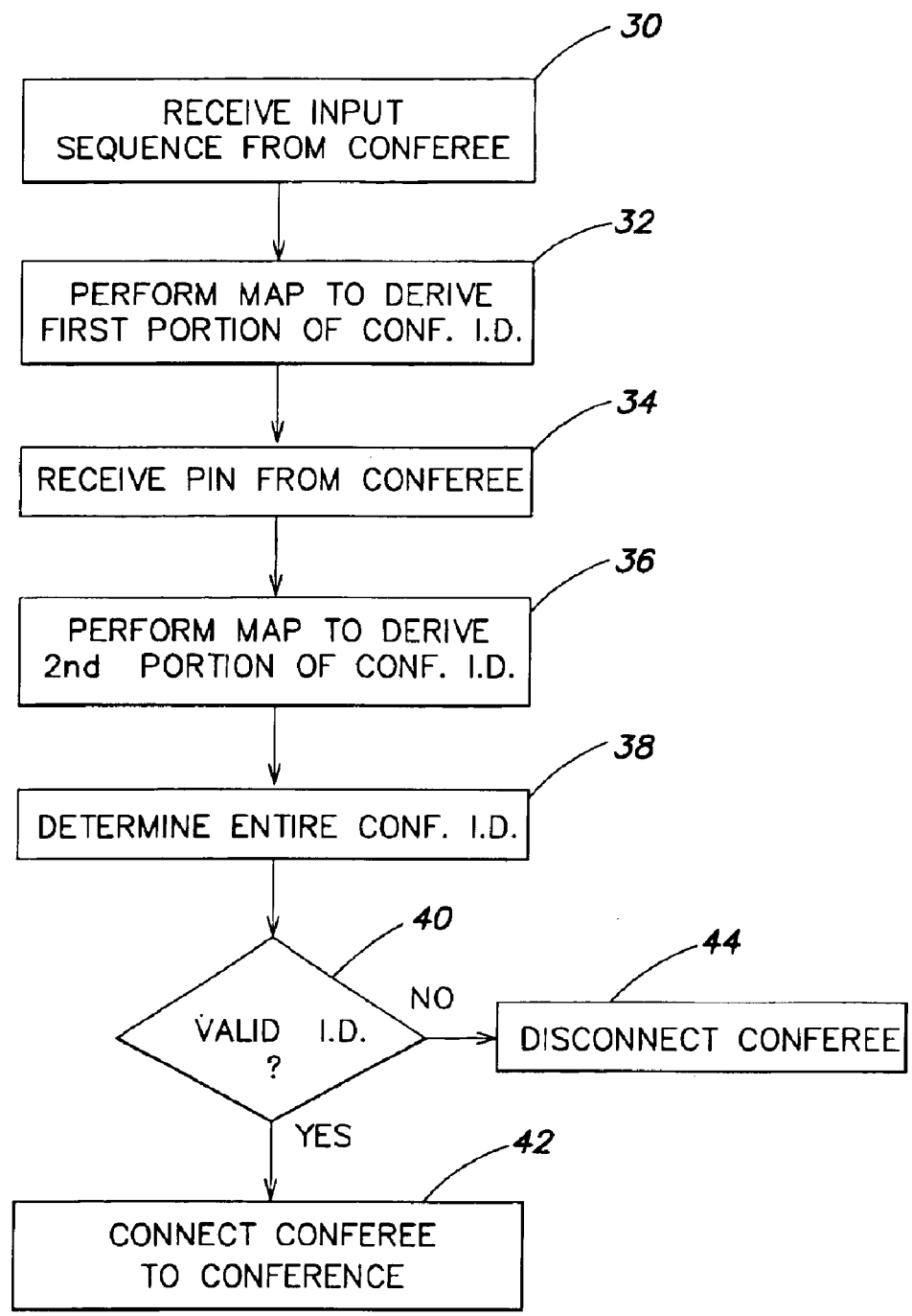
FIG. 3 is a flow diagram illustrating an exemplary method for connecting a conferee to a conference.

According to one embodiment of a method of teleconferencing, a conference I.D. number, associated with a unique, predetermined conference, is divided into two portions. A first portion includes a string of digits derived from the dialed number identification service (DNIS) information of a pre-assigned telephone number. A second portion is derived from a personal identification number (PIN) assigned to, and ultimately entered by, a conferee. FIG. 3 is a flow diagram illustrating an example method that may be implemented by the teleconferencing bridge to connect a conferee to a conference. First, the bridge may receive an input sequence from a potential conferee (step 30). For example, when a conferee uses the pre-assigned DID telephone number to call into the teleconferencing bridge, the bridge may extract the DNIS information (i.e. the entered number) that arrives with the call. The bridge may perform a predetermined function to obtain the first portion of the conference I.D. number (step 32), for example, from the DNIS information. The bridge may receive a PIN from the conferee (step 34), and perform another predetermined function to obtain the second portion of the conference I.D. number from the PIN (step 36). A conference I.D. number that uniquely identifies a particular conference, may be derived from a combination of the first portion, derived from the DNIS information, and the second portion determined from the PIN (step 38). The teleconferencing bridge may validate the conference I.D. number (step 40), and connect the conferee to a particular conference based on the validated conference I.D. number (step 42). Validation may include comparing the conference I.D. number with a list of stored conference I.D. numbers, as will be discussed in more detail *infra*. If the conference I.D. is found to be invalid (step 40), then an action is taken to prevent the connection of the conferee to the conference (step 44). For example, the conferee may be disconnected or an error message may be played for or displayed to the conferee.

The functions performed by the teleconferencing bridge may include any predetermined map that determines one string of digits from another. For example, the map may be a simple direct map. Thus, if the conferee enters the telephone number 555-1234, the teleconferencing bridge may obtain the first portion of the conference I.D. number to be 1234. Alternatively, the map may be a reversal of the digits. Thus, if the conferee enters the telephone number 555-1234, the teleconferencing bridge may obtain the first portion of the conference I.D. number to be 4321. Furthermore, the function may return a string of digits that is longer or shorter than the string received. The table below contains several examples of possible functions that may be used by the teleconferencing bridge to obtain the first portion of the conference I.D. number. It is to be appreciated that these examples are merely for purposes of illustration and not intended to be limiting. The methods described herein may be implemented using any conceivable map function a user may desire to use.

| Conferee enters: | DNIS provides: | First portion of Conference I.D.: | |
|---|---|---|---|
| 1-800-555-1234 | 555-1234 | 1234 | Direct map |
| 1-617-555-1234 | 555-1234 | 11223344 | More digits created |
| 1-888-555-1234 | 555-1234 | 4321 | Reversal |
| 1-800-555-1234 | 555-1234 | 3475 | Function map |

Similarly, the function performed by the teleconferencing bridge to generate the second portion of the conference I.D. number from the PIN entered may be any possible map function. The bridge need not perform the same map function on the PIN as was used to determine the first portion of the conference I.D. number.

Since the conference I.D. number is derived from both the DNIS information, and the user entered PIN, by using a large number of DID numbers, which may be obtained from a network service provider, a shorter PIN may be used. The teleconferencing bridge validates the entire conference I.D. number, formed from the DNIS information and the user entered PIN, as though the user had entered the entire string themselves. For example, each conferee may be assigned a four digit PIN, and the teleconferencing bridge may extract four digits from the DNIS information to create an eight digit conference I.D. number. However, the PIN may be any number of digits and the teleconferencing bridge may extract any number of digits from the DNIS information to create the conference I.D. number. The PIN need not have the same number of digits as is extracted from the DNIS information. Nor is the extraction required to be direct. I.e., the teleconferencing bridge may be controlled to map a string of digits received from the DNIS information to another string of digits that are used to form the conference I.D. number. For example, but without limitation to these examples:

| Conferee enters: | DNIS info: | PIN entered: | Conference I.D.: | |
|---|---|---|---|---|
| 1-800-555-1234 | 555-1234 | 5678 | 12345678 | Direct map |
| 1-800-555-1234 | 555-1234 | 345 | 51234345 | Shorter PIN, more digits used from DNIS info |
| 1-800-555-1234 | 555-1234 | 5678 | 15263748 | Conf. ID may not be simple concatenation |
| 1-800-555-1234 | 555-1234 | 5678 | 43215678 | Reversed DNIS info added to PIN |
| 1-800-555-1234 | 555-1234 | 5678 | 87651234 | Reversed PIN added to DNIS info |

Once the conference I.D. number has been derived from the DNIS information and the PIN entered by the conferee, the teleconferencing bridge validates the conference I.D. number to determine whether it is a valid conference I.D. number, and to which conference the conferee should be connected to. The teleconferencing bridge may include a storage element, such as a hard-disk, memory device, tape drive, etc., where it may store a list or database of valid conference I.D. numbers. Validation of the conference I.D. number may include comparing the conference I.D. number received with this list. The teleconferencing bridge may also store information associated with each conference I.D. number and with individual subscribers, such as usage records, billing records, etc., as will be discussed in more detail *infra*. After the conference I.D. number has been validated, and assuming the conference I.D. number is found to be valid, the conferee is connected to the particular conference identified by the conference I.D. number. The teleconferencing bridge may continually allocate and re-allocate communication channels and bandwidth to a plurality of conferees as conferences are begun and terminated and conferees are added to an removed from conferences. There may not be a fixed channel assigned to any particular conference. Rather, the bridge may allocate channels and/or bandwidth on a dynamic basis, adjusting to the number of conferees connected at any time.

According to one example, a first PIN may be assigned to a host conferee and a second, different PIN to a group of guest conferees. The teleconferencing bridge may thus distinguish between a host and guests based on the different PINs, which allows the host to be assigned different privileges than the guests in the conference. For example, the host may be able to allow guests to join the conference, or to terminate the conference. In another example, the host and guest conferees may call in using different DID numbers, and may be assigned the same or a different PIN. Because the teleconferencing bridge uses both information from the DID number and the PIN to generate the conference I.D. number, either the PIN or the DID number may be used to distinguish between a host and guests. For example,

| Conferee enters: | DNIS info: | PIN entered: | Conference I.D.: | |
|---|---|---|---|---|
| 1-800-555-1234 | 555-1234 | 5678 | 12345678 = | Host |
| 1-800-555-1234 | 555-1234 | 8765 | 12348765 = | Guest |
| 1-800-555-4321 | 555-4321 | 5678 | 43215678 = | Host |
| 1-800-555-1234 | 555-1234 | 5678 | 12345678 = | Guest |

The telephone service provider may also include "charge" information, such as an area, country or toll-free code, with the DNIS information associated with a number. The teleconferencing bridge may be programmed to use this information for billing purposes, to differentiate between a local call, a domestic toll free call, or an international toll free call. The teleconferencing bridge may extract billing information, such as an area code or country code, and may store this information with an associated subscriber record so that each conferee may be appropriately billed. For example,

| Conferee enters: | DNIS info: | PIN entered: | Conference I.D.: | |
|---|---|---|---|---|
| 1-800-555-1234 | 800-555-1234 | 5678 | 12345678 = | Toll-free |
| 1-617-555-1234 | 617-555-1234 | 5678 | 12345678 = | Billed |

According to one embodiment, the teleconferencing bridge may be provided with software to implement the methods described above. The teleconferencing bridge may include programmable device, such as a digital signal processor (DSP) or microprocessor, or may be interfaced with a personal computer to run the software. The method may be implemented as one or more software instructions, that may be executed by one or more processors associated with the teleconferencing bridge. The instructions may be encoded on a computer readable medium, such as one or more compact discs (CDs), diskettes, integrated circuit chips, or any other suitable medium or media. The method may also be encoded as a set of instructions modulated on a carrier wave which may be transmitted to the teleconferencing bridge to be executed on a microprocessor or other programmable device at the bridge.

According to another embodiment, the method for teleconferencing described above may be implemented using voice-over-IP or a similar technology. As described above, voice-over-IP refers to a communication methodology wherein voice is transmitted over a data, typically packet switched, network such as the Internet or a local area network (LAN). In one example each conferee may be provided with an IP address, which may be given as a domain name. Instead of the conferee entering a telephone number via a telephone handset, the conferee may use any suitable Internet browser to access their assigned IP address. The conferee may then enter their assigned PIN, and the teleconferencing bridge may connect the conferee to a conference, according to any of the embodiments described above. The conferee may use a telephone interface, for example software provided by an operating system on their computer, to use, for example, the computer's microphone and speaker, a headset, or a digital telephone, to interface to the computer and to conduct the conference. The data network may be interfaced with the public switched telephone network, or the entire teleconferencing system may be Internet-based, without using a public switched telephone system except insofar as the Internet inherently relies in part on the public switched telephone system.

Having thus described various embodiments and aspects thereof, several modifications or variations may be apparent to those of skill in the art. Such modifications and variations are intended to be covered by this disclosure which is by way of illustration only and not intended to be limiting. The scope of the invention should be determined from proper construction of the appended claims, and their equivalents.

What is claimed is:

1. A method of assigning access information for a teleconference to a group of conferees, comprising:
    assigning a conference I.D. number including a plurality of digits to the group of conferees;
    dividing the conference I.D. number into a first portion including at least one digit and a second portion including at least one digit;
    assigning an input sequence of digits to the group of conferees, the input sequence being derived from the first portion of the conference I.D. number through a predetermined mapping; and
    assigning a PIN to each conferee of the group of conferees, the PIN being derived from the second portion of the conference I.D. number through a predetermined mapping.

2. The method as claimed in claim 1, further comprising assigning access information to a predetermined teleconference to each conferee of the group of conferees based on a combination of the input sequence of digits and the PIN entered by each conferee.

3. The method as claimed in claim 1, wherein dividing the conference I.D. number into a first portion and a second portion includes dividing the conference I.D. number in half.

4. The method as claimed in claim 1, wherein dividing the conference I.D. number into the first portion and the second portion includes selecting alternate digits of the plurality of digits of the conference I.D. number to form the first portion, and forming the second portion from the remaining ones of the plurality of digits of the conference I.D. number.

5. The method as claimed in claim 1, wherein assigning the input sequence of digits includes assigning to the group of conferees an IP address.

6. The method as claimed in claim 1, wherein assigning the input sequence of digits includes assigning a telephone number.

7. A method of allocating available space on a teleconferencing bridge to a group of subscriber units, the method comprising:
    receiving information derived from a telephone number upon which a call from a subscriber unit is received, the telephone number including a first string of digits;
    receiving a PIN from the subscriber unit;
    deriving, from the PIN and the information derived from the telephone number, a conference I.D. number that includes a second string of digits at least partly derived from the first string of digits;
    validating the conference I.D. number; and
    allocating the space to the subscriber unit based on a result of validating the conference I.D. number.

8. The method as claimed in claim 7, wherein receiving information derived from the telephone number includes receiving an area code associated with the telephone number.

9. The method as claimed in claim 7, wherein deriving the conference I.D. number comprises combining the PIN and at least a portion of the information derived from the telephone number.

10. The method as claimed in claim 7, wherein deriving the conference I.D. number comprises combining a string of digits derived from the PIN with the information derived from the telephone number.

11. A computer readable medium encoded with a plurality of instructions for execution on at least one processor, the plurality of instructions performing a method for accessing a teleconference, the method comprising:
   receiving information derived from an input sequence entered by a subscriber unit, the input sequence including a first string of digits;
   receiving a PIN from the subscriber unit;
   deriving, from the PIN and the information derived from the input sequence, a conference I.D. number that includes a second string of digits, at least a portion of the second string of digits being derived from the first string of digits; and
   validating the conference I.D. number.

12. The computer readable medium as claimed in claim 11, wherein the method further includes connecting the subscriber unit to a predetermined teleconference based on the validation of the conference ID. number.

13. The computer readable medium as claimed in claim 11, wherein deriving the conference I.D. number comprises combining the PIN and at least a portion of the information derived from the input sequence.

14. The computer readable medium as claimed in claim 11, wherein the first string of digits is a telephone number.

15. The computer readable medium as claimed in claim 11, wherein the first string of digits is an IP address.

16. A teleconferencing bridge including at least one programmable device effecting a sequence of instructions comprising:
   receiving information derived from a first string of digits entered by a conferee;
   receiving a PIN entered by the conferee;
   deriving, from the PIN and a portion of the information derived from the first string of digits, a conference I.D. number; and
   validating the conference I.D. number;
   wherein the conference I.D. number includes a second string of digits, at least a portion of the second string of digits being derived from the first string of digits.

17. The teleconferencing bridge as claimed in claim 16, wherein the sequence of instructions further comprises connecting the conferee to a predetermined teleconference based on the validation of the conference I.D. number.

18. The teleconferencing bridge as claimed in claim 16, wherein the at least one programmable device includes a digital signal processor (DSP).

19. The teleconferencing bridge as claimed in claim 16, wherein the programmable device includes a storage element that stores a database of records corresponding to a plurality of conferees.

20. The teleconferencing bridge as claimed in claim 16, wherein the first string of digits is an IP address.

21. The teleconferencing bridge as claimed in claim 16, wherein the first string of digits is a telephone number.

22. The teleconferencing bridge as claimed in claim 21, wherein the sequence of instructions includes:
   receiving information derived from an area code of the telephone number entered by the conferee; and
   utilizing the information derived from the area code to assign billing information to a record corresponding to the conferee.

23. The teleconferencing bridge as claimed in claim 22, wherein the information derived from the area code includes country code information.

24. The teleconferencing bridge as claimed in claim 16, wherein deriving the conference I.D. number comprises combining the PIN and at least a portion of the information derived from the first string of digits.

25. The teleconferencing bridge as claimed in claim 21, wherein the information derived from the telephone number comprises billing information.

26. The teleconferencing bridge as claimed in claim 16, wherein the at least one programmable device includes a storage element and wherein validating the conference I.D. includes comparing the conference I.D. with a plurality of conference I.D.s stored in the storage element.

27. A teleconferencing bridge including at least one programmable device effecting a sequence of instructions comprising:
   receiving information derived from an input sequence entered by a conferee, the input sequence comprising a first string of digits;
   receiving a PIN from the conferee; and
   generating a conference I.D. number including a second string of digits derived from at least a portion of the first string of digits and the PIN.

28. The teleconferencing bridge as claimed in claim 27, wherein the sequence of instructions further comprises allowing the conferee access to a predetermined conference based on the conference I.D. number.

29. The teleconferencing bridge as claimed in claim 27, wherein the input sequence comprises a telephone number.

30. The teleconferencing bridge as claimed in claim 27, wherein the input sequence comprises an IP address.

31. A teleconferencing bridge including at least one programmable device effecting a sequence of instructions comprising:
   assigning a conference I.D. number including a plurality of digits to the group of conferees;
   dividing the conference I.D. number into a first portion including at least one digit and a second portion including at least one digit;
   assigning an input sequence of digits to the group of conferees, the input sequence being derived from the first portion of the conference I.D. number through a predetermined mapping; and
   assigning a PIN to each conferee of the group of conferees, the PIN being derived from the second portion of the conference I.D. number through a predetermined mapping.

32. A computer readable medium encoded with a plurality of instructions for execution on at least one processor, the plurality of instructions performing a method of assigning access information for a teleconference to a group of conferees, comprising:
   assigning a conference I.D. number including a plurality of digits to the group of conferees;
   dividing the conference I.D. number into a first portion including at least one digit and a second portion including at least one digit;
   assigning an input sequence of digits to the group of conferees, the input sequence being derived from the first portion of the conference I.D. number through a predetermined mapping; and
   assigning a PIN to each conferee of the group of conferees, the PIN being derived from the second portion of the conference I.D. number through a predetermined mapping.

* * * * *